(12) United States Patent
Martin et al.

(10) Patent No.: US 8,903,099 B2
(45) Date of Patent: Dec. 2, 2014

(54) END OF BRANCH MODULE SYSTEM (75) Inventors: Hardison G. Martin, Gatlinburg, TN (US); Robert A. Ponto, Louisville, KY (US); John David Johnson, Louisville, KY (US); William Brown, Louisville, KY (US)

(73) Assignee: Mitek Corp., Inc., Phoenix, AZ (US)

( * ) Notice: Subject to any disclaimer, the term of this patent is extended or adjusted under 35 U.S.C. 154(b) by 461 days.

(21) Appl. No.: 13/270,117

(22) Filed: Oct. 10, 2011

(65) Prior Publication Data

US 2013/0089210 A1 Apr. 11, 2013

(51) Int. Cl.
*H04R 29/00* (2006.01)
*H04M 9/08* (2006.01)

(52) U.S. Cl.
CPC ...................................... *H04M 9/08* (2013.01)
USPC ................... 381/58; 381/77; 381/81; 381/82; 381/59; 381/120

(58) Field of Classification Search
CPC ........... H04R 29/00; H04B 3/00; H03G 11/00
USPC ............................................. 381/8–82, 120
See application file for complete search history.

(56) References Cited

U.S. PATENT DOCUMENTS

| 7,602,282 | B2 | 10/2009 | Martin et al. | |
| 7,834,744 | B2 | 11/2010 | Bullmore | |
| 8,208,654 | B2 * | 6/2012 | Coutinho et al. | 381/81 |
| 8,265,294 | B2 * | 9/2012 | Tjalsma et al. | 381/82 |
| 2006/0182288 | A1 * | 8/2006 | Arcaria et al. | 381/82 |
| 2007/0085694 | A1 | 4/2007 | Larkin | |
| 2008/0317252 | A1 * | 12/2008 | Tjalsma et al. | 381/59 |

FOREIGN PATENT DOCUMENTS

WO WO2008003917 1/2008

* cited by examiner

*Primary Examiner* — Disler Paul
(74) *Attorney, Agent, or Firm* — Keith L. Jenkins, Registered Patent Attorney, LLC; Keith L. Jenkins (57) ABSTRACT An end-of-branch (EOB) module system for an audio signal distribution system having a wired trunk and a plurality of wired branches extending communicatively from such trunk, the EOB module system including: a plurality of EOB modules including one EOB module electronically coupled at each distal end of each branch and trunk of the audio signal distribution system, where each EOB module of the plurality of EOB modules has a unique address together forming a plurality of unique addresses; a test system able to send a test carrier signal encoded with any one unique address of the plurality of unique addresses at a time onto the trunk; and a switch within each EOB module, responsive to its unique address to place an end-of-line (EOL) load on its respective branch or trunk, and where power for operation of each EOB module is provided by rectification of the test signal.

20 Claims, 6 Drawing Sheets

END OF BRANCH MODULE SYSTEM

TECHNICAL FIELD

The present invention generally relates to a testing apparatus for individual audio speakers that are each one of a plurality of audio speakers driven by the same amplifier. The present invention also relates to systems comprising a plurality of speakers driven by a common amplifier and having built-in-test capability.

BACKGROUND

An end-of-line (EOL) monitor and test system was developed to verify the operation of a sound system in facilities such as airports, convention centers, industrial and stadiums. The system operates by sending an inaudible tone over the normal sound system, typically in the range of 19 KHz to 20 KHz, and then measuring the voltage and current of the power amps driving the speakers. A fault is declared for any change in the impedance of the load which causes a voltage or current deviation, compared to a preset level, greater than a predetermined fault threshold.

The EOL monitor and test system will identify a fault on a single line, but does not tell where on the line the fault occurred. The EOL monitor and test system also will not tell if a line is cut to a speaker on a branch, or, if there are a lot of speakers on the circuit, it will not tell if there is a fault on a single speaker because the change will be too small to measure. To overcome this, all the speakers can be wired in serial fashion on one wire and putting some kind of detecting device on the end of that line, such as an EOL device. This is a very expensive way to wire speakers, and most existing installations run a line down a single hall or corridor and branch off to the sides to areas with one or more speakers in them. If one of these branches is broken, it could not be detected using the EOL device.

Accordingly, the end-of-branch (EOB) system of the present invention was developed to overcome these problems. Accordingly, it is desirable to be able to detect faults in individual speakers on audio signal lines that are branched from a trunk audio signal line. In addition, it is desirable to achieve such fault detection with a minimum of expense. Furthermore, other desirable features and characteristics of the present invention will become apparent from the subsequent detailed description and the appended claims, taken in conjunction with the accompanying drawings and the foregoing technical field and background.

The ability to individually address each speaker leads to another use of the EOB with the addition of a new switch (T) that is connected to another set of terminals so an individual speaker (V) can be disconnected by command. This would allow routing audio to any or all speakers on the amplifiers output from the main system. This would allow paging to a single room without disturbing the whole building, and in turn, turning off a conference room that does not warrant to be interrupted. This could be used with or without the end of line testing that is the primary use of the EOB module.

BRIEF SUMMARY

An apparatus is provided for an end-of-branch (EOB) module system for an audio signal distribution system having a wired trunk and a plurality of wired branches extending from such trunk, the EOB module system including: a plurality of EOB modules including one EOB module electronically coupled at each distal end of each branch and trunk of the audio signal distribution system, where each EOB module of the plurality of EOB modules has a unique address together forming a plurality of unique addresses; a test system able to send a test carrier signal encoded with any one unique address of the plurality of unique addresses at a time onto the trunk and branches; and a switch within each EOB module, responsive to its unique address to place an end-of-line (EOL) load on its respective branch or trunk. The EOB module system, where the EOB module includes a CPU able to drive the switch responsive to receiving the unique address. The EOB module system, where the EOB module includes a programmable CPU. The EOB module system, where power for operation of each EOB module is provided by rectification of the test carrier signal. The EOB module system, where the EOB module includes a demodulator capable of detecting the unique addresses and data. The EOB module system, where the test system is further able to automatically: detect voltage variations in the amplifier responsive to the placement of the EOL load; detect current variations in the amplifier responsive to the placement of the EOL load; determine if one of the voltage variation and the current variation is outside one of a predetermined voltage range and a predetermined current range, respectively; and indicate one of a fault condition and a non-fault condition associated with the one unique address responsive to the determination. The EOB module system, where the EOL includes a resistance, a capacitance, and an inductance coupled in series. The EOB module system, further including a second switch within at least one said EOB module coupled to at least one speaker, respectively, external to said at least one EOB module and operable to disconnect said at least one speaker from said audio test signal. The EOB module system, where the module includes a first switch that is open when no power is applied. The EOB module system, where the audio signal distribution system further includes sub-branches, further including EOB modules electronically coupled to each end of each sub-branch. The EOB module system, where EOB modules removes the EOL load from the branch or trunk after a predetermined time or from a control command from the test system.

An EOB module system for an audio signal distribution system having a wired trunk and a plurality of wired branches extending from such trunk, the EOB module system including: a plurality of EOB modules including one EOB module at each end of each branch and trunk of the audio signal distribution system, where each EOB module of the plurality of EOB modules has a unique address together forming a plurality of unique addresses; a test system able to send a test carrier signal encoded with any one unique address of the plurality of unique addresses at a time onto the trunk; a switch within each EOB module, responsive to its unique address to place an end-of-line (EOL) load on its respective branch or trunk; and where the EOB module includes a CPU able to drive the switch responsive to receiving the unique address. The EOB module system, where: the EOB module includes a programmable CPU; power for operation of each EOB module is provided by rectification of the test signal; and the EOB module includes a comparator able to compare a rectified encoded test carrier signal with a reference voltage to produce the unique address. The EOB module system, where the test system is further able to automatically: detect voltage variations in the amplifier responsive to the placement of the EOL load; detect current variations in the amplifier responsive to the placement of the EOL load; determine if one of the voltage variation and the current variation is outside one of a predetermined voltage range and a predetermined current range, respectively; and indicate one of a fault condition and a non-fault condition associated with the one unique address responsive to the determination. The EOB module system, where the EOL includes a resistance, a capacitance, and an inductance coupled in series. The EOB module system, where the module includes a switch that is open when no power is applied. The EOB module system, where the audio signal distribution system further includes sub-branches, further including EOB modules electronically coupled to each distal end of each sub-branch.

An EOB module system for an audio signal distribution system having a wired trunk and a plurality of wired branches extending from such trunk, the EOB module system including: a plurality of EOB modules including one EOB module at each end of each branch and trunk of the audio signal distribution system, where each EOB module of the plurality of EOB modules has a unique address together forming a plurality of unique addresses; a test system able to send a test carrier signal encoded with any one unique address of the plurality of unique addresses at a time onto the trunk; a switch within each EOB module, responsive to its unique address to place an end-of-line (EOL) load on its respective branch or trunk; where the EOB module includes a CPU able to drive the switch responsive to receiving the unique address; and where: the EOB module includes a programmable CPU; power for operation of each EOB module is provided by rectification of the test signal; and the EOB module includes a comparator able to compare a rectified encoded test carrier signal with a reference voltage to produce the unique address; the EOL includes a resistance, a capacitance, and an inductance coupled in series; and where the switch includes a switch that is open when no power is applied. The EOB module system, where the test system is further able to automatically: detect voltage variations in the amplifier responsive to the placement of the EOL load; detect current variations in the amplifier responsive to the placement of the EOL load; determine if one of the voltage variation and the current variation is outside one of a predetermined voltage range and a predetermined current range, respectively; and indicate one of a fault condition and a non-fault condition associated with the one unique address responsive to the determination. The EOB module system, where the audio signal distribution system further includes sub-branches, further including EOB modules electronically coupled to each distal end of each sub-branch.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
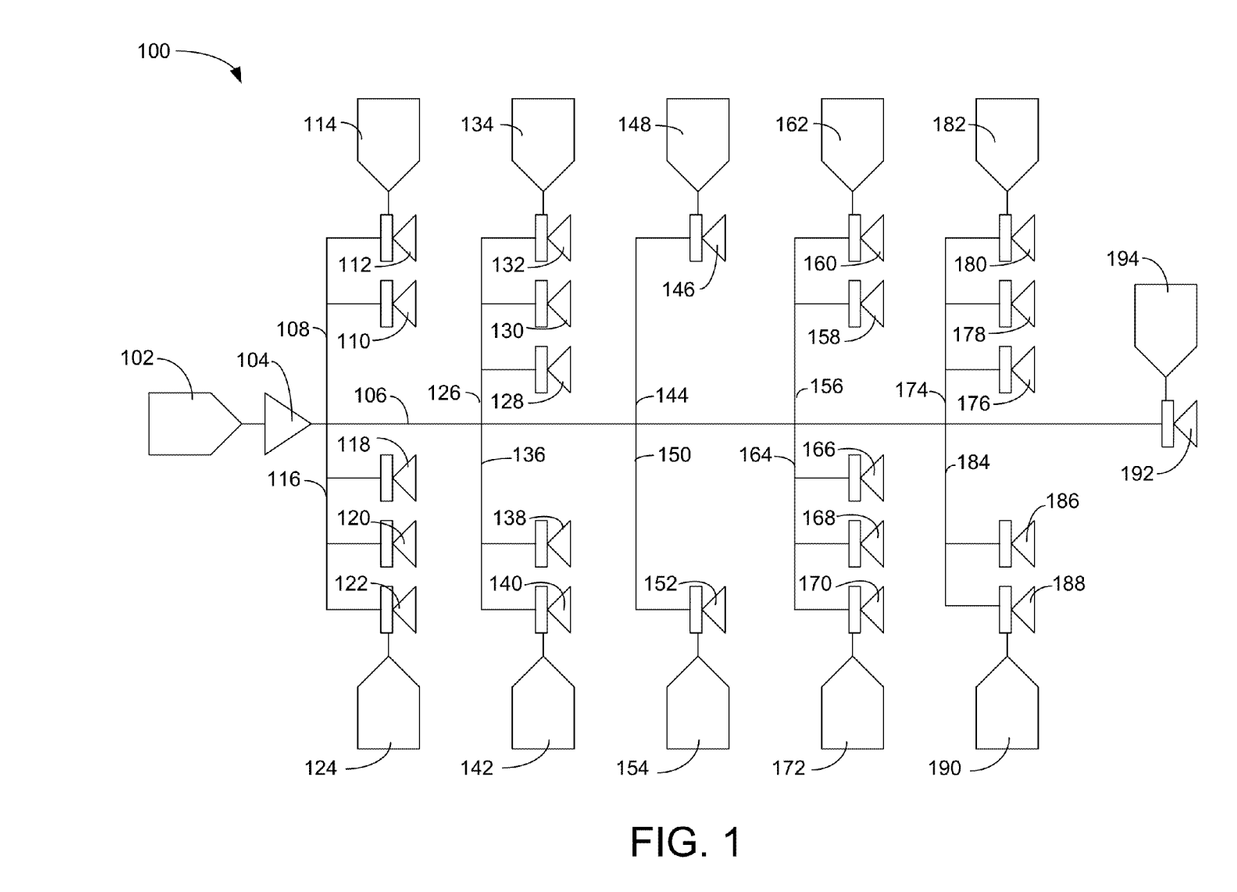
FIG. 1 is a diagram illustrating an exemplary trunk and branch audio signal distribution system with exemplary end-of-branch modules, according to a preferred embodiment of the present invention.

FIG. 1 is a diagram illustrating an exemplary trunk 106 and branch 108, 116, 126, 136, 144, 150, 156, 164, 174, and 184 audio signal distribution system with exemplary end-of-branch module system 100, according to a preferred embodiment of the present invention. Test system 102 produces the test signal, monitors the voltage and current through amplifier 104, and addresses EOB (end-of-branch) devices 114, 124, 134, 142, 148, 154, 162, 172, 182, 190, and 194 individually. The EOB devices 114, 124, 134, 142, 148, 154, 162, 172, 182, 190, and 194 are active versions of the EOL (end-of-line) device 222 (See FIG. 2). The EOB devices 114, 124, 134, 142, 148, 154, 162, 172, 182, 190, and 194 can be used to verify the integrity of lines 106, 108, 116, 126, 136, 144, 150, 156, 164, 174, and 184 that have multiple taps and branches 108, 116, 126, 136, 144, 150, 156, 164, 174, and 184 on one amplifier 104. The system 100 is merely exemplary, and any number of branches 108, 116, 126, 136, 144, 150, 156, 164, 174, and 184, with any number of speakers 110, 112, 118, 120, 122, 128, 130, 132, 138, 140, 146, 152, 158, 160, 166, 168, 170, 176, 178, 180, 186, 188, and 192 may be used, limited only by the power in amplifier 104 and the addressing limitations of the CPU 214. Test system 102 supplies the encoded test signal to the amplifier 104 at the proximal end of trunk 106 and the EOB modules are coupled to the distal end of trunk 106 and the distal ends of branches 108, 116, 126, 136, 144, 150, 156, 164, 174, and 184.

In the example system shown in FIG. 1, the EOL device 222 would overload the amplifier 104 at the test tone frequency if added to every speaker 110, 112, 118, 120, 122, 128, 130, 132, 138, 140, 146, 152, 158, 160, 166, 168, 170, 176, 178, 180, 186, 188, and 192 on the lines 106, 108, 116, 126, 136, 144, 150, 156, 164, 174, and 184 powered by amplifier 104, and a fault would not be detected if only one of the many branches 108, 116, 126, 136, 144, 150, 156, 164, 174, and 184 is cut. The EOB devices 114, 124, 134, 142, 148, 154, 162, 172, 182, 190, and 194 will use the same EOL 222 load circuit but it will not be connected until each specific EOB device 114, 124, 134, 142, 148, 154, 162, 172, 182, 190, and 194 is addressed by the test system 102, one at a time. Each EOB device 114, 124, 134, 142, 148, 154, 162, 172, 182, 190, and 194 may then be identified with a single load 222 (See FIG. 2) on the amplifier 104.

Figure 2:
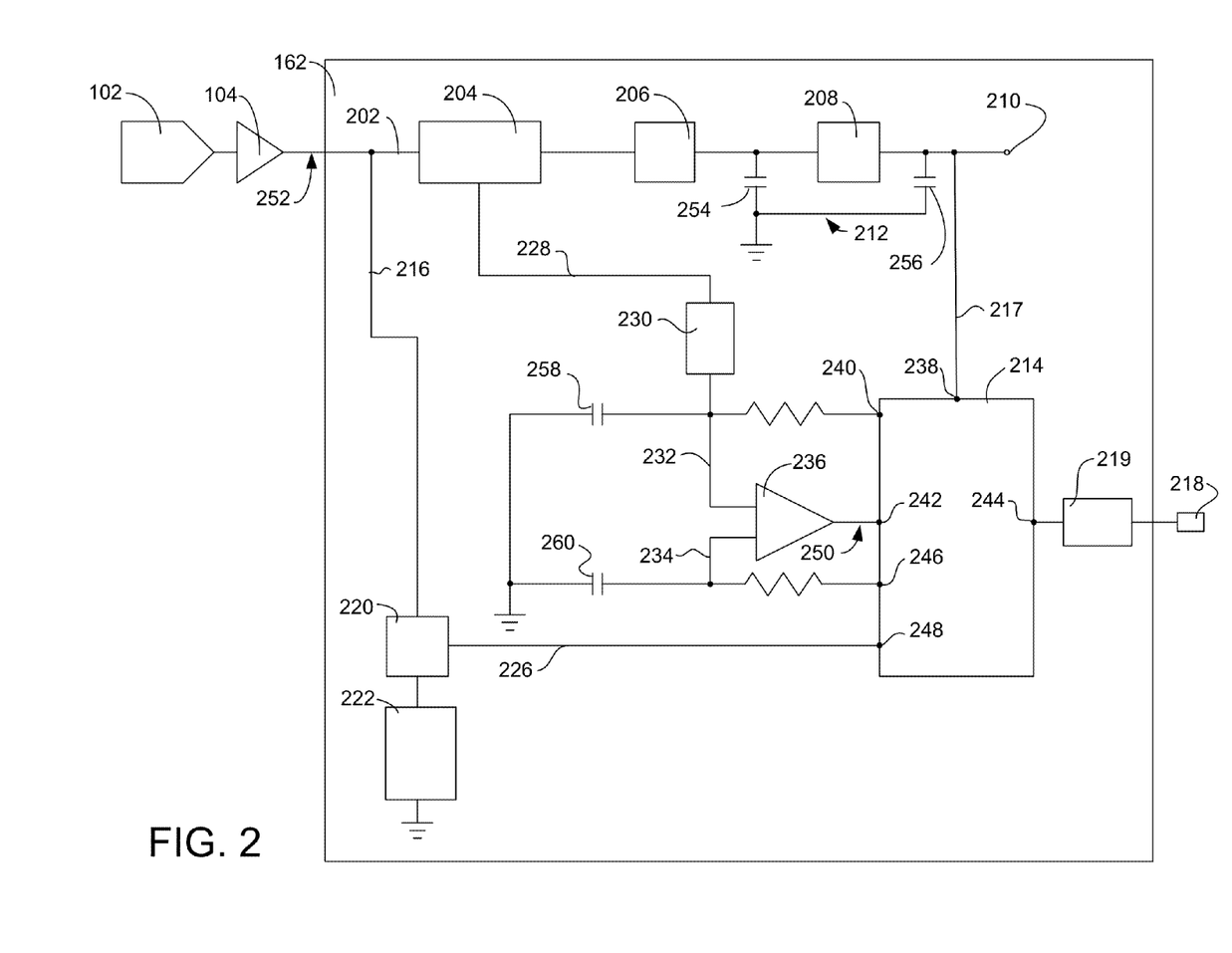
FIG. 2 is a diagram illustrating an exemplary end-of-branch module, according to a preferred embodiment of the present invention.

FIG. 2 is a diagram illustrating an exemplary end-of-branch module 162, according to a preferred embodiment of the present invention. The module includes a CPU 214 that receives and sends a serial data stream on serial port 244 via RS232 port 218 and driver 219 for purposes of programming the CPU 214. CPU 214 is powered at power input 238 over line 217 from Vcc 210. Power at Vcc 210 is generated from the high frequency test signal 252 through exemplary 20 KHz tuned circuit 204, bridge rectifier 206, and shunt regulator 208.

The test system 104 will generate an inaudible test tone 252 and modulate the test tone with a unique code 250 for each EOB device 114, 124, 134, 142, 148, 154, 162, 172, 182, 190, and 194. As the code 250 is detected at contact 242 of the CPU 214, a switch 220 will switch in the EOL 222 circuit and the test system 104 will detect the amplifier 104 current. A fault will be reported for any EOB module 114, 124, 134, 142, 148, 154, 162, 172, 182, 190 or 194 that does not load the circuit as expected by the test system 102. Each EOB module 114, 124, 134, 142, 148, 154, 162, 172, 182, 190, and 194 will be assigned a unique code 250 so a reported fault can be identified with the physical location of that fault.

While the EOB modules 114, 124, 134, 142, 148, 154, 162, 172, 182, 190 or 194 are shown at the end first branches 108, 116, 126, 136, 144, 150, 156, 164, 174, and 184, and off trunk 106, additional sub-branches off branches 108, 116, 126, 136, 144, 150, 156, 164, 174, and 184 are possible. Accordingly, each speaker 110, 112, 118, 120, 122, 128, 130, 132, 138, 140, 146, 152, 158, 160, 166, 168, 170, 176, 178, 180, 186, 188, and 192 could have its own EOB module, with the leads from the branches 108, 116, 126, 136, 144, 150, 156, 164, 174, and 184 to speakers 110, 112, 118, 120, 122, 128, 130, 132, 138, 140, 146, 152, 158, 160, 166, 168, 170, 176, 178, 180, 186, 188, and 192 being sub-branches.

The power for each EOB module 114, 124, 134, 142, 148, 154, 162, 172, 182, 190 or 194 will not be derived from the normal program audio, but only the high frequency test tone 252. Speakers 110, 112, 118, 120, 122, 128, 130, 132, 138, 140, 146, 152, 158, 160, 166, 168, 170, 176, 178, 180, 186, 188, and 192 in some areas may not be used for long periods of time with normal program audio, but can still be tested at any time using the test tone as a reliable supply of power.

The operation is based on the reception of code 250 in the form of a standard serial data stream 250 (like that used for RS232) to convey the unique code 250 to address a particular EOB device 162, for example. The code 250 will tell the CPU 214 to turn on the switch 220 by sending an ON signal from switch driver port 248 along line 226 which will put the EOL load circuit 222 across the speaker line 216. This load 222 will automatically be removed after a short time to keep from dragging down its own supply voltage Vcc 210 and the supply voltages of the other EOB devices 114, 124, 134, 142, 148, 154, 172, 182, 190, and 194 on the speaker circuit. The short time will be long enough for test system 102 to detect the EOL 222 load and determine if there is a fault at that branch 156 of the speaker line 106. The test system 102 will then move on to test the next EOB device 172 on the line 164. Multiple tests may be used to insure there is truly a fault. One design option is for a second code to be sent that turns off all loads 222. This code could also precede the testing to insure the loads 222 are all off before the test begins. Another fail-safe option in the CPU 214 program will detect its brownout voltage of Vcc 210 to the CPU 214 and turn off the switch 220 before the CPU 214 shuts down just to make sure the switch 220 is always left off. Power is provided to CPU 214 over line 217 from Vcc 210.

The actual operation starts when a test tone signal 252 is applied to all EOBs 114, 124, 134, 142, 148, 154, 162, 172, 182, 190 or 194 on that amplifier's 104 speaker line 106 and branches 108, 116, 126, 136, 144, 150, 156, 164, 174, and 184. What follows uses EOB 164 as an example: operation of all EOBs 114, 124, 134, 142, 148, 154, 162, 172, 182, 190 and 194 is the same.

The test tone signal 252 is rectified by bridge rectifier 206 and charges the main supply capacitor 254. This may take several seconds but once charged, main supply capacitor 254 will supply power for the rest of the test. The signal at 228 is rectified by rectifier 230, stored on capacitor 258, and measured by the CPU 214. A second signal on the sample and hold capacitor 260 is driven with pulse width modulation (PWM) from the PWM contact 246 of CPU 214 to be a reference 234 for the input 232 of the comparator 236. The short time constant at input 232 of comparator 236 is fast enough to change at the rate of the data rate at 250, but slower than the test tone carrier, so the net output from the comparator 236 is the data 250 that is modulating the input signal 252. Since both inputs 232 and 234 are the same voltage, except for the modulation, the only difference between the two appears in output 250 of comparator 236. It only takes a small change to create an output 250 from the comparator 236, which is also independent of actual level on line 228, but dependent on the changes, 258 vs. 260, in that level. This allows the signal 250 to be detected over a ten to one range of input test signal 252 level as long as the reference level 260 can be established first and power is sufficient to operate the switch 220 when needed.

When the switch 220 applies the load EOL device 222, the incoming test signal 252 voltage drops due to the impedance of the load of the EOL device 222. Since the EOL device 222 drops the voltage available at Vcc 210, a separate capacitor 256 is used to power the EOB 162 while the switch 220 is on, thus insuring that EOB device 164 can always be removed as an EOL device 222 load.

The biggest problem is supplying enough power to run all the electronics in the EOB device 164. A shunt voltage regulator 208 is used so that no power is wasted by the shunt voltage regulator 208 until it is up to operating value for Vcc 210. As the input voltage 252 increases, the shunt voltage regulator 208 clamps the voltage Vcc 210 to keep voltage Vcc 210 from going any higher by shunting off the excess power. This power Vcc 210 is supplied from a resonant circuit 204 (at the test tone frequency) by shunting the resonant current of the circuit thru the EOB device 162. The actual AC voltage on the resonant circuit 204 tap 228 at normal test signal levels 252 are in excess of 150 VAC, and as high as 500 VAC, but the voltage and current are 90 degrees out of phase at 228. So, there is zero power consumed, except for the loss of the EOB device's 162 power needs. The three volt drop at Vcc 210 in series with the resonant circuit 204 is insignificant. At the voltages on 228 the current is very small so the current of the EOB device 162 must be very small. By very careful selection of all the parts and by operating the CPU 214 at low clock frequency and voltage, the total current needed is less than one milliampere. The switch 220 needs twenty milliamperes, but for only seven-hundred milliseconds, so it is operated from the charge on a capacitor 256. All the diodes are extremely low leakage to allow rectification with only nano-amperes of current. The comparator 236 draws 0.12 milliamperes and the CPU 214 is the balance of the load.

The EOB device 162 has an RS232 driver 219 that is powered from the RXD line 218 coming in and needs no power from the internal system Vcc 210. RS232 driver 219 is only needed for programming and debugging the CPU 214, which is done with the RS232 driver 219 connected to an external computer that supplies the power. While the present invention has been illustrated using RS232 serial data communication technology, those of skill in the art, enlightened by the present disclosure, will appreciate that Universal Serial Bus (USB) technology, or other serial data communications technology, may be used in place of RS232 technology, and is within the scope of the present invention.

Figure 4:
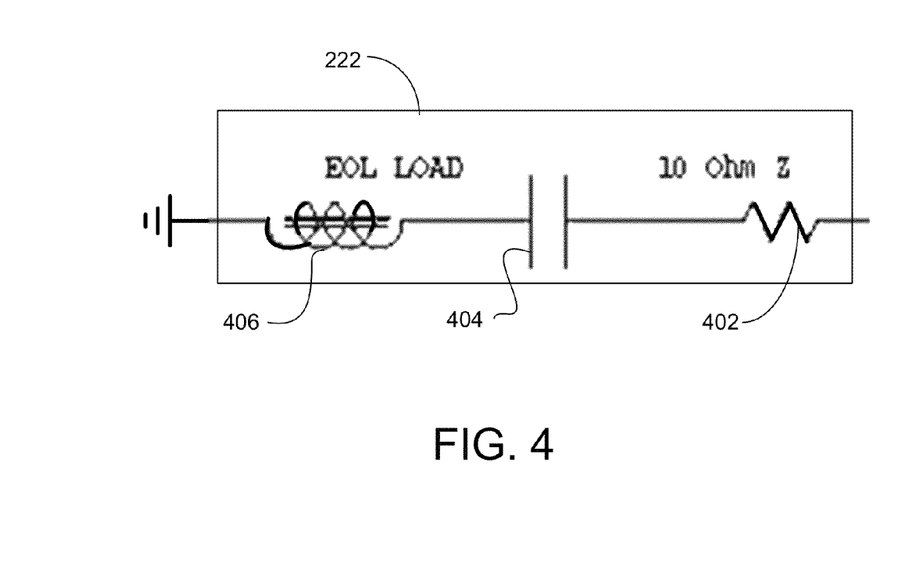
FIG. 4 is a diagram illustrating the circuitry within an exemplary end-of-line device, according to a preferred embodiment of the present invention.

There exists a possibility that the switch 220 could stick on and leave the EOL 222 load on the speaker line 216. In this case, the 20 kHz signal could cause a resistor in the EOL 222 to burn up. For this reason, a special class of fusible, flame proof resistor is used for the 10 ohm resistor in the EOL 220 circuit. If this fuse action does happen, the EOB 164 would no longer work and would cause a fault report, so it could be identified and replaced.

The opposite problem of the EOL 222 sticking on at low input voltage could drop the Vcc 210 to a level too low for the CPU 214 to operate, but in this case the switch 220 also runs out of power so it opens up and fixes the problem.

Figure 3:
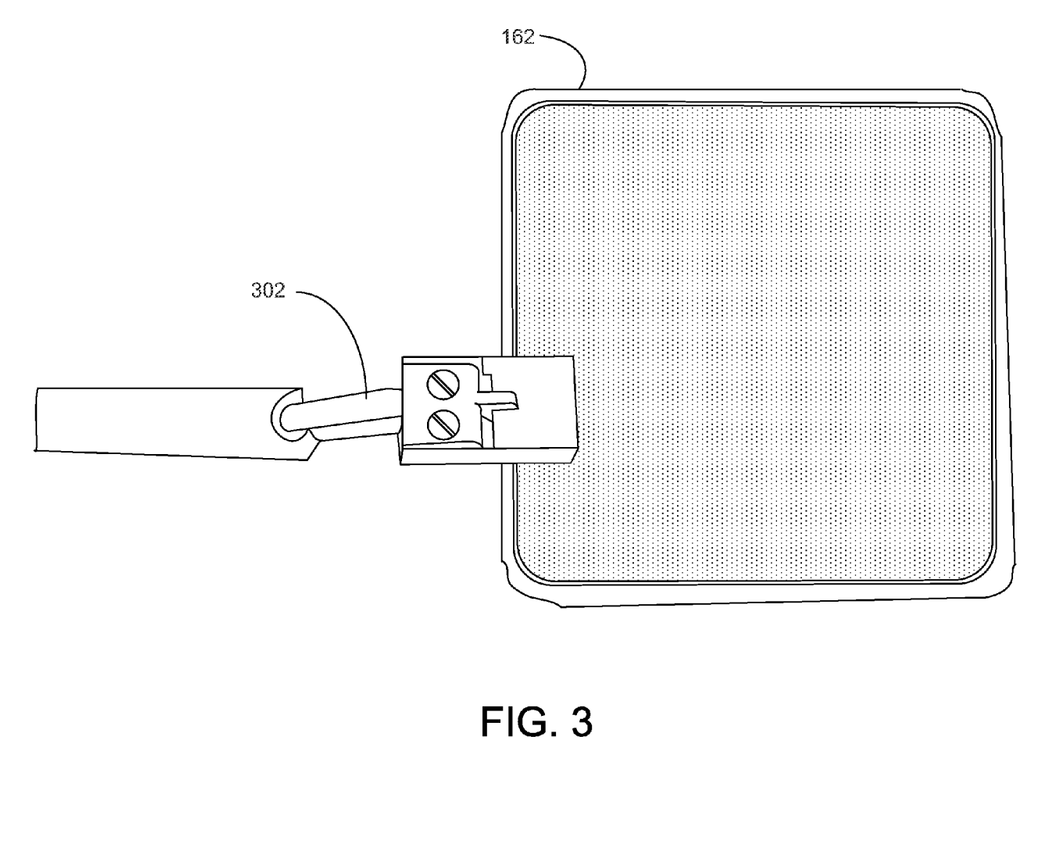
FIG. 3 is a photograph illustrating an exemplary end-of-branch module, according to a preferred embodiment of the present invention.

FIG. 3 is a photograph illustrating an exemplary end-of-branch module 164, according to a preferred embodiment of the present invention. The end-of-branch module 164 can be made quite small, the illustrated EOB module 162 having a two-inches by two-inches form factor. Leads 302 connect to the end of the trunk 106, or branch 108, 116, 126, 136, 144, 150, 156, 164, 174, or 184, or sub-branch (lines to speakers), etc.

FIG. 4 is a diagram illustrating the circuitry within an exemplary end-of-line device 222, according to a preferred embodiment of the present invention. Input resistor 402 is preferably a flame resistant resistor 402. Inductive load 406 is coupled to resistor 402 through capacitor 404. The resonant frequency of the EOL 222 circuit is not the test signal carrier frequency, and so the EOL 222 circuit creates a load at the test signal frequency when switched in as a load.

Figure 5:
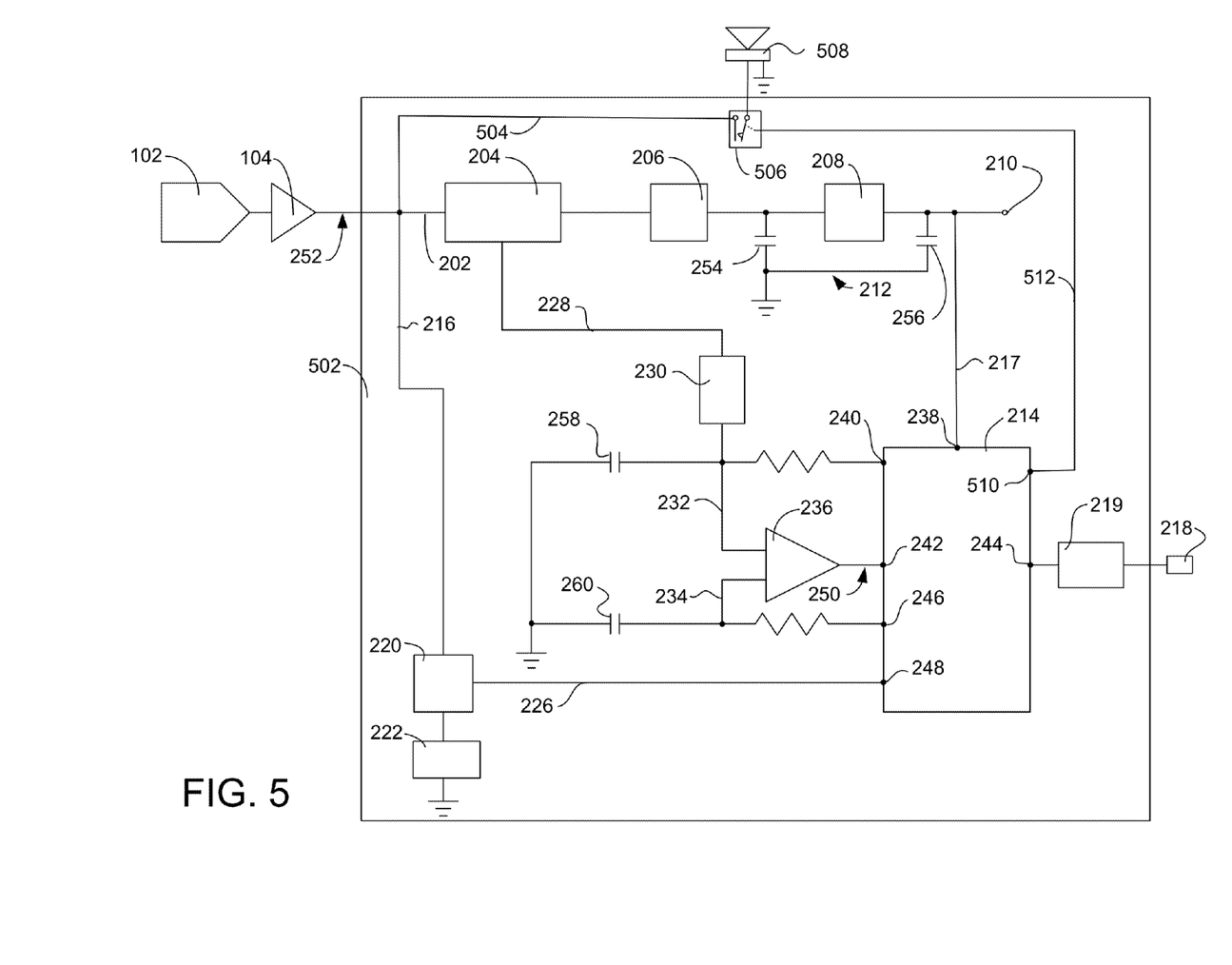
FIG. 5 is a diagram illustrating a second embodiment of an exemplary end-of-branch module, according to a preferred embodiment of the present invention.

FIG. 5 is a diagram illustrating a second embodiment of an exemplary end-of-branch module, according to a preferred embodiment of the present invention. The ability to individually address each speaker 508 leads to another use of the EOB 502 with the addition of a switch 506 that is connected to another set of terminals so an individual speaker 508 can be disconnected by command. Switch driver line 512 connects CPU 214 switch driver output 510 to switch 506 enabling control of the supply of the audio signal on audio signal line 504 to speaker 508. The use of a plurality of such EOBs 502 allows routing audio to any or all speakers 110, 112, 118, 120, 122, 128, 130, 132, 138, 140, 146, 152, 158, 160, 166, 168, 170, 176, 178, 180, 186, 188, and 192 on the amplifiers 104 output from the main system. This would allow paging to a single room without disturbing the whole building, and in turn, turning off a conference room that does not want to be interrupted.

Figure 6:
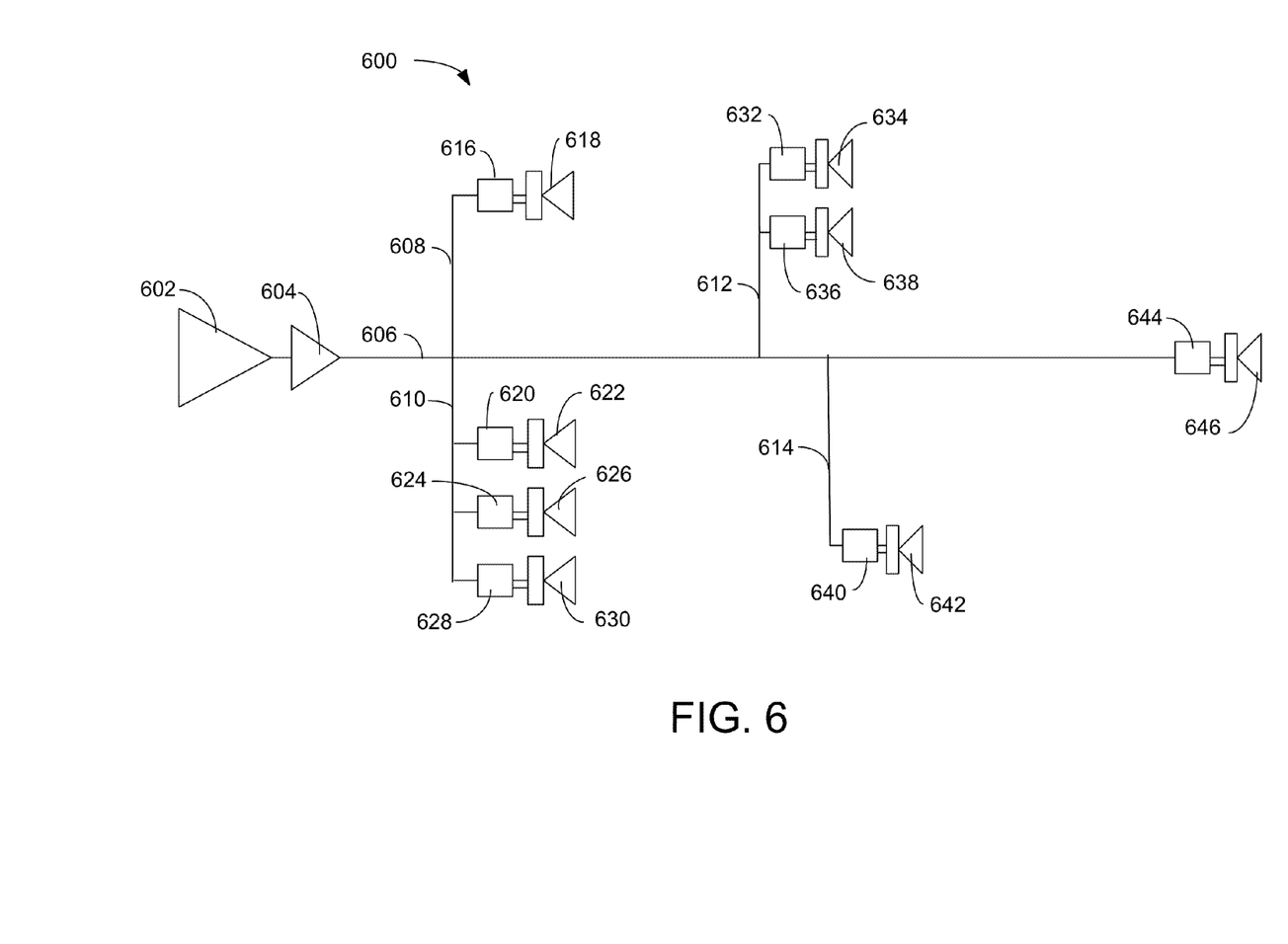
FIG. 6 is a diagram illustrating an exemplary trunk and branch audio signal distribution system with exemplary end-of-branch modules, according to a second preferred embodiment of the present invention.

FIG. 6 is a diagram illustrating an exemplary trunk 606 and branch 608, 610, 612, 614 audio signal distribution system 600 with exemplary addressable audio modules 616, 630, 624, 628, 632, 636, 640, and 644, according to a second preferred embodiment of the present invention. Addressable audio modules 616, 630, 624, 628, 632, 636, 640, and 644 may be addressed by the test system 602 to turn speakers 618, 622, 626, 630, 634, 638, 642, and 646, respectively, ON or OFF. The addressable audio modules 616, 630, 624, 628, 632, 636, 640, and 644 are preferably EOB modules 502 with switch 506 and associated circuitry. Switch 506 enables remote configuration of the ON/OFF status of each speaker 618, 622, 626, 630, 634, 638, 642, and 646, respectively, in addition to providing the branch integrity testing capability of the EOB module 162.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. An end-of-branch (EOB) module system for an audio signal distribution system having a wired trunk and a plurality of wired branches extending from such trunk, said EOB module system comprising:
   a. a plurality of EOB modules comprising one EOB module electronically coupled at each distal end of each branch and trunk of said audio signal distribution system, where each said EOB module of said plurality of EOB modules has a unique address together forming a plurality of unique addresses;
   b. a test system operable to send a test carrier signal encoded with any one unique address of said plurality of unique addresses at a time onto said trunk and branches;
   c. a switch within each said EOB module, responsive to its unique address to place an end-of-line (EOL) load on its respective branch or trunk;
   d. an amplifier for amplifying said test carrier signal before said test carrier signal is sent; and
   e. wherein said test system is further operable to automatically detect voltage variations in said amplifier responsive to said placement of said EOL load; and
   f. determine if said voltage variation is outside one of a predetermined voltage range.

2. The EOB module system of claim 1, wherein said EOB module comprises a CPU operable to drive said switch responsive to receiving said unique address.

3. The EOB module system of claim 1, wherein said EOB module comprises a programmable CPU.

4. The EOB module system of claim 1, wherein power for operation of each said EOB module is provided by rectification of said test carrier signal.

5. The EOB module system of claim 1, wherein said EOB module comprises a demodulator capable of detecting the unique addresses and data.

6. The EOB module system of claim 1, wherein said test system is further operable to automatically:
   a. detect current variations in said amplifier responsive to said placement of said EOL load;
   b. determine if said current variation is outside a predetermined current range; and
   c. indicate one of a fault condition and a non-fault condition associated with said one unique address responsive to at least one of said determinations.

7. The EOB module system of claim 1, wherein said EOL comprises a resistance, a capacitance, and an inductance coupled in series.

8. The EOB module system of claim 1, further comprising a second switch within at least one said EOB module coupled to at least one speaker, respectively, external to said at least one EOB module and operable to disconnect said at least one speaker from said audio test signal.

9. The EOB module system of claim 1, wherein said module comprises a switch that is open when no power is applied.

10. The EOB module system of claim 1, wherein said audio signal distribution system further comprises sub-branches, further comprising EOB modules electronically coupled to each end of each sub-branch.

11. The EOB module system of claim 1, wherein EOB modules removes said EOL load from said branch or trunk after a predetermined time or from a control command from said test system.

12. An EOB module system for an audio signal distribution system having a wired trunk and a plurality of wired branches extending from such trunk, said EOB module system comprising:
  a. a plurality of EOB modules comprising one EOB module at each end of each branch and trunk of said audio signal distribution system, where each said EOB module of said plurality of EOB modules has a unique address together forming a plurality of unique addresses;
  b. a test system operable to send a test carrier signal encoded with any one unique address of said plurality of unique addresses at a time onto said trunk;
  c. a switch within each said EOB module, responsive to its unique address to place an end-of-line (EOL) load on its respective branch or trunk;
  d. wherein said EOB module comprises a CPU operable to drive said switch responsive to receiving said unique address;
  e. an amplifier for amplifying said test carrier signal before said test carrier signal is sent; and
  f. wherein said EOB module comprises a comparator operable to compare a rectified of said encoded test carrier signal with a reference voltage to produce said unique address.

13. The EOB module system of claim 12, wherein:
  a. said EOB module comprises a programmable CPU; and
  b. power for operation of each said EOB module is provided by rectification of said test signal.

14. The EOB module system of claim 12, wherein said test system is further operable to automatically:
  a. detect voltage variations in said amplifier responsive to said placement of said EOL load;
  b. detect current variations in said amplifier responsive to said placement of said EOL load;
  c. determine if one of said voltage variation and said current variation is outside one of a predetermined voltage range and a predetermined current range, respectively; and
  d. indicate one of a fault condition and a non-fault condition associated with said one unique address responsive to said determination.

15. The EOB module system of claim 12, wherein said EOL comprises a resistance, a capacitance, and an inductance coupled in series.

16. The EOB module system of claim 12, wherein said module comprises a switch that is open when no power is applied.

17. The EOB module system of claim 12, wherein said audio signal distribution system further comprises sub-branches, further comprising EOB modules electronically coupled to each distal end of each sub-branch.

18. An EOB module system for an audio signal distribution system having a wired trunk and a plurality of wired branches extending from such trunk, said EOB module system comprising:
  a. a plurality of EOB modules comprising one EOB module at each end of each branch and trunk of said audio signal distribution system, where each said EOB module of said plurality of EOB modules has a unique address together forming a plurality of unique addresses;
  b. a test system operable to send a test carrier signal encoded with any one unique address of said plurality of unique addresses at a time onto said trunk;
  c. a switch within each said EOB module, responsive to its unique address to place an end-of-line (EOL) load on its respective branch or trunk;
  d. wherein said EOB module comprises a CPU operable to drive said switch responsive to receiving said unique address; and
  e. wherein:
    i. said EOB module comprises a programmable CPU;
    ii. power for operation of each said EOB module is provided by rectification of said test signal;
    iii. said EOB module comprises a comparator operable to compare a rectified said encoded test carrier signal with a reference voltage to produce said unique address;
    iv. said EOL comprises a resistance, a capacitance, and an inductance coupled in series;
    v. said switch comprises a switch that is open when no power is applied and
  f. an amplifier for amplifying said test carrier signal before said test carrier signal is sent.

19. The EOB module system of claim 18, wherein said test system is further operable to automatically:
  a. detect voltage variations in said amplifier responsive to said placement of said EOL load;
  b. detect current variations in said amplifier responsive to said placement of said EOL load;
  c. determine if one of said voltage variation and said current variation is outside one of a predetermined voltage range and a predetermined current range, respectively; and
  d. indicate one of a fault condition and a non-fault condition associated with said one unique address responsive to said determination.

20. The EOB module system of claim 18, wherein said audio signal distribution system further comprises sub-branches, further comprising EOB modules electronically coupled to each distal end of each sub-branch.

* * * * *